INVENTOR
JOHN L. McCLURE

United States Patent Office 3,423,660
Patented Jan. 21, 1969

3,423,660
MOTOR WINDING CONTROL MEANS
John L. McClure, Waukesha, Wis., assignor to General Electric Company, a corporation of New York
Filed July 13, 1966, Ser. No. 564,977
U.S. Cl. 318—221    4 Claims
Int. Cl. H02p 1/04

ABSTRACT OF THE DISCLOSURE

Improved control means for use with a single phase induction motor having a main winding, a start winding and a motor shaft. Basically, the improved control means comprises normally-closed contact means openable at a preselected pressure to de-energize the start winding in response to a stream of pressurized fluid that is developed by compression means and delivered to the contact means through fluid amplifier means. The compression means is adapted to be operatively associated with the motor shaft such that the stream pressure is proportional to the operational speed of the motor and is fluid connected to the contact means through the fluid amplifier means in such a manner that the stream is not delivered to the contact means unless it is at or above the preselected pressure. Two embodiments of the fluid compression means are illustrated, both of which include a compression chamber. In one embodiment, the chamber comprises a housing adapted to be disposed adjacent the motor shaft, and cam means are provided which are adapted to be secured to the shaft for rotation therewith externally of the housing. In the other embodiment, the chamber comprises an annular housing adapted to surround a segment of the motor shaft, and fan blades are provided which are adapted to be secured to the shaft within the housing.

---

This invention relates to electric motor control systems, and, more particularly, to means for controlling the energization circuit of the start winding of a single phase induction motor by means responsive to the speed of the motor.

Single phase induction motors generally include a main or operating winding therein, and an auxiliary or start winding. Conventionally, the start winding must be energized, and subsequently de-energized after the motor achieves a predetermined percentage of its normal operating speed. Such motors have been provided with various types of speed responsive controls wherein the start winding of the motor is de-energized at the desired proportional speed of the motor, whereupon the main winding will bring the motor up to its full rated speed. Among the means responsive to the speed of the motor shaft for de-energizing the start winding circuit are included fluid responsive devices that act directly on the start winding contacts.

In a number of fluid responsive devices known to applicant, a pressure build-up is required before separation of the contacts that remove the start winding from the circuit occurs. More specifically, as a required pressure must be built-up to overcome the biasing force that maintains the contacts in a conducting relationship, the separation of the contacts is not instantaneous but actually occurs over a short period of time. While this is mechanically satisfactory, it is well known that a slow separation of contacts increases the amount of arcing therebetween. Where there is an increase in arcing, it is necessary to provide contacts of a superior quality, which thereby increases the cost of the motor. Alternatively, while switches of the snap-action type that accommodate a pressure build-up are available, they are relatively costly in comparison to the simple pressure actuated switch.

In a copending application by Jack E. Bebinger, entitled "Motor Winding Control Embodying a Fluid Amplifier," Ser. No. 564,786, filed of even date herewith and assigned to my present assignee, there is described a novel fluid control means system that provides an improved fluid control means system that includes a fluid amplifier to achieve an essentially instantaneous application of the required pressure on the start winding contacts.

It is an object of my invention to provide means for incorporating the fluid amplifier control system described in the aforesaid application to devices, such as food waste disposers, which presently use fractional horsepower single phase induction motors.

It is a further object of my invention to provide means associated with a single phase induction motor having start and run windings, for supplying a compressed fluid stream through pneumatic circuits to a fluid amplifier, whereby the fluid amplifier may be advantageously employed to control the energization and de-energization of the start winding.

Briefly stated, in accordance with one aspect of my invention, there is provided a control means for a single phase induction motor having a main winding, a start winding, and a motor shaft. The control means includes pressure actuated contact means for controlling energization of the start winding. A compression chamber having a fluid inlet opening thereto and a fluid discharge outlet therefrom is provided; fluid compression means are disposed within the compression chamber and in operative association with the motor shaft to provide a stream of fluid through the fluid discharge outlet at pressures proportional to the speed of the motor.

A fluid amplifier is also provided, having an inlet opening, a power chamber, first and second control ports, and first and second outlet passages. The first outlet passage is adapted to exhaust the fluid stream to atmosphere, while the second outlet passage communicates with the pressure actuated contact means, whereby the fluid stream exiting from the second outlet pasage is directed against the pressure actuated contact means to thereby control de-energization of the start winding. The second control port communicates with atmosphere and thereby admits air at ambient pressure to the fluid amplifier.

A fluid conducting means is provided to interconnect the fluid discharge outlet of the compression chamber to the inlet opening of the fluid amplifier. A first fluid conducting passage is provided to interconnect the inlet opening with the power chamber. A second fluid conducting passage interconnects the first fluid conducting passage with the first control port. A pressure actuated valve means is disposed in the second fluid conducting passage, and is responsive to a preselected pressure of the fluid stream flowing through the first fluid conducting passage to admit a portion of the fluid stream into the second fluid conducting passage and thereby pass fluid under pressure through the first control port.

The power chamber, the first and second control ports, the first outlet passage and the second outlet passage are arranged so that the fluid stream entering the main inlet will exit through the first outlet passage so long as air under ambient pressure enters through the second control port, and the pressure actuated valve prevents the flow of fluid through the first control port. The power chamber, the first and second control ports, and the first and second outlet passages are further arranged so that the fluid stream will exit through the second outlet passage when the pressure actuated valve means admits fluid under pressure to said first control port, whereby de-energization of the start winding is dependent upon the speed of operation of the motor.

Other features and advantages of my invention will be apparent from the following detailed description read in connection with the accompanying drawings, in which:

FIGURE 4 is a bottom plan view of the fluid amplifier and connecting passages comprising part of the present invention; and FIGURE 5 is a schematic representation of a control circuit for the motor of FIGURE 1.

Figure 1:
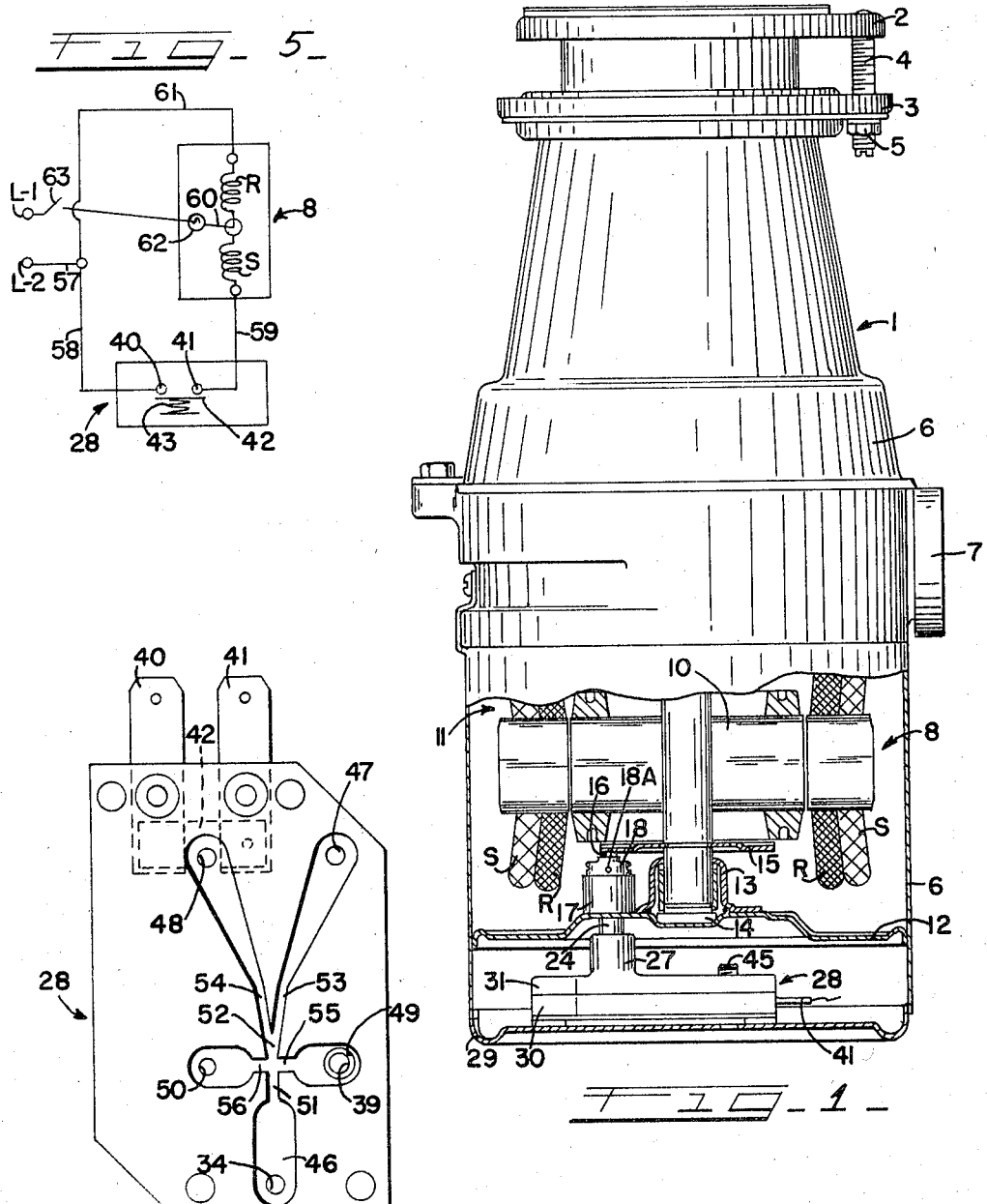
FIGURE 1 is a side elevational view in partial cross section of a food waste disposer having a single phase induction motor embodying my improved motor winding control means.

Referring first to FIGURE 1, there is shown a food waste disposer 1, having at its top an upper clamping ring 2 and a support ring 3 disposed therebelow. A set screw 4 and nut 5 are provided for conveniently mounting the disposer on the flange of a sink or other supporting structure. Immediately below the lower support ring 3 is a casing 6 that serves as a hopper for the grinding of refuse; at the bottom of the hopper (not shown in the drawings) are the conventional shredding ring and flywheel assembly. A drain housing 7 provides an opening whereby waste may be flushed through the hopper and into suitable sewage lines, all of which is conventional and forms no part of the present invention.

Positioned below the flywheel assembly is a small, fractional horsepower single phase induction motor, indicated generally by numeral 8. Motor 8 has a rotor shaft 9 extending therethrough, to which the flywheel assembly (not shown) is rigidly secured at the upper end. An armature 10 is carried by shaft 9, and disposed about the armature is the stator 11 which includes start and run windings, S and R respectively, as is conventional.

A bottom bearing plate 12 is rigidly positioned within casing 6 and supports shaft 9 for rotary movement. An upper bearing assembly (not shown) is provided to maintain the shaft in proper alignment. Disposed on the bottom of shaft 9 and on bearing plate 12 is a bearing cup assembly 13, which includes an oil wick 14 disposed therein.

Figure 2:
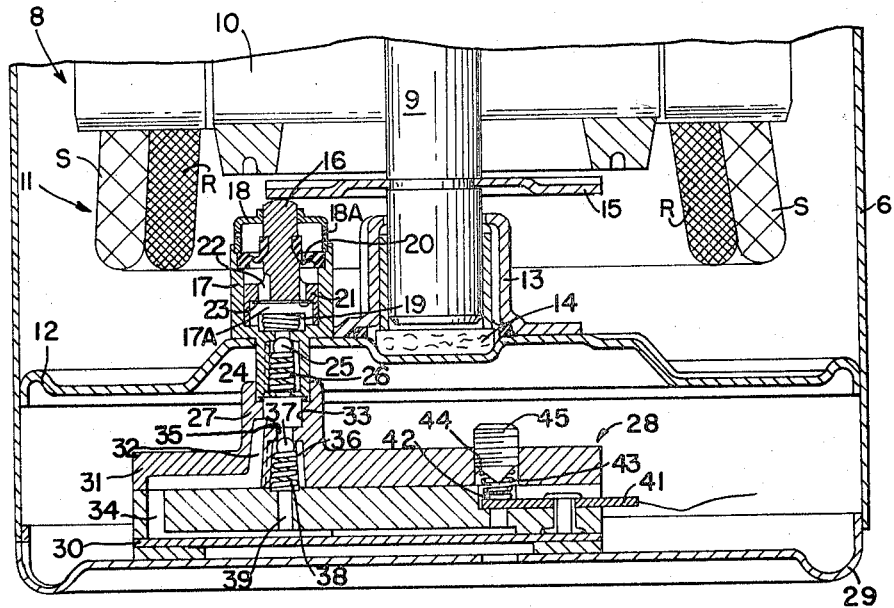
FIGURE 2 is an enlarged side elevational view in partial cross section of the food waste disposer of FIGURE 1 and illustrates a first embodiment of my invention.

Referring now to FIGURES 1 and 2, it will be seen that rigidly secured to shaft 9, immediately below armature 10, is a cam plate 15 having a series of circumferentially spaced cam lobes formed thereon. Below the cam plate, a piston follower 16 is mounted for vertical reciprocatory movement within a housing 17 that is secured to the bottom bearing plate 12. The housing 17 provides a compression chamber 17A for air in the manner hereafter described.

An upper piston stabilizer 18 is mounted on the top of housing 17 to maintain piston 16 in proper vertical alignment, with the upper end of piston 16 in contact with the cam plate. A piston spring 19 is disposed at the bottom of compression chamber 17A, so that when shaft 9 rotates, and the cam lobes on the cam plate cause the piston to descend, piston spring 19 causes piston 16 to rise and ride into the dwell surfaces of the cam plate until the next cam lobe thereon causes the piston to again be downwardly depressed.

A flexible piston boot 20 is disposed about piston 16 and extends to the inner periphery of housing 17, where it is positioned between the piston stabilizer 18 and the housing 17. A number of circumferentially spaced openings 18A are provided in the piston stabilizer to allow air to flow into the area defined by the piston boot and the piston stabilizer. The piston boot 20 also has a suitable number of spaced openings therethrough (not shown) that permit air to flow through the boot and into the area defined by the bottom of the boot and the annular portion 21 of the piston. A passage 22 extends through the annular portion 21 of the piston which permits air to flow from the area above the annular portion into the compression chamber 17A. A diaphragm 23 is secured to the bottom end of the piston, whereby air may flow through passage 22 in one direction only.

Housing 17 further includes a downwardly extending tubular extension 24 that passes through an opening in the cover plate. Disposed within the chamber formed by the tubular extension 24 is a first ball valve 25 and compression spring 26. The bottom end of the tubular extension is disposed within an inlet fitting 27 that forms part of the fluid amplifier indicated generally by numeral 28. The fluid amplifier 28 is disposed within the compartment defined by the bottom support plate 29 and the lower bearing plate 12, and is rigidly mounted to the bottom support plate 29.

When shaft 9 rotates, the opposing action of the cam lobes and compression spring cause the piston to reciprocate within housing 17. During this reciprocation, air flows into the piston stabilizer 18 through the openings 18A, and then passes through the openings in boot 20. As the piston moves upwardly, the diaphragm 24 is deflected away from the end of passage 23, and the air between the boot and the annular portion 21 of the piston will flow downwardly through the passage 23 into the compression chamber 17A. Upon downward movement of the piston, the air within compression chamber 17A will be compressed because diaphragm 24 prevents the return movement of air through passage 23. The ball valve 25 and spring 26 are designed so that after a suitable pressure is achieved within chamber 17A, the ball valve 25 will force spring 26 downwardly, whereupon air under pressure will flow from the compression chamber 17A through the tubular extension 24 and into the inlet fitting 27 of the fluid amplifier.

Referring now to FIGURES 2 and 4, wherein the same numerals apply to identical parts, it will be observed that the fluid amplifier 28 includes a control plate 30 and a cover plate 31 thereover. Cover plate 31 includes the aforementioned inlet fitting 27 on the top surface thereof. The inlet fitting 27 has a first fluid conducting passage 32 therethrough that extends from the opening 33 of the inlet fitting, through the cover plate 31 and into inlet conduit 34 in the control plate 30. A second fluid conducting passage 35 extends from the opening 33 of inlet fitting 27 to a chamber 36 disposed therebelow. Disposed within chamber 36 is a second ball valve 37 and compression spring 38. Spring 38 normally biases ball valve 37 upwardly, closing passage 35, and thus normally prevents air from entering chamber 36. A passage 39 extends from the bottom of chamber 36 to the control surface of the amplifier, for reasons hereafter explained.

At the opposite end of the fluid amplifier there is disposed a set of horizontally spaced electrical terminals 40 and 41. Positioned above terminals 40 and 41 is a bridging contact plate 42. A compression spring 43 is located within a passage 44 in cover plate 31, and is positioned above contact plate 42. Spring 43 normally maintains plate 42 in closed circuit relation with terminals 40 and 41, and thereby provides a continuous electrical path through the amplifier. The terminals 40 and 41 and plate 42 in effect provide an electrical switch in the amplifier. A conical set screw 45 is positioned in the top of passage 44 to provide calibrating adjustment for spring 43.

Referring now to FIGURE 4, wherein the configuration of the fluid amplifier is best illustrated, it will be seen that the control plate 30 includes main inlet or power chamber 46 which is disposed immediately below the passage 34. The amplifier 28 further includes a first outlet port 47 and a second outlet port 48. The first outlet port 47 comprises a passage through the amplifier that communicates with atmosphere, while the second outlet port (FIGURES 2 and 3) extends through the cover plate of the amplifier to a point midway between the ends of contact plate 42. A first control port 49 is in communication with passageway 39. A second control port 50 is in communication with atmosphere by way of a passage (not shown) extending from opening 50 on the control surface through the cover plate.

Fluid amplifiers, of the type illustrated in FIGURE 4, which is the type utilizing a side control jet to deflect a main fluid stream into one of several branch passages, are well known. In this type of device, a main stream passageway is connected to a chamber from which branch passageways lead off. At the point where the main stream enters the chamber, side ports for passage of control fluid transverse to the main fluid stream are provided which, by selectively allowing such control fluid to flow, will control the main stream by deflecting it in the desired branch passage. These devices are therefore referred to as fluid amplifier due to the fact that a small control fluid flow may be utilized to control the flow of a large fluid stream. Naturally, an advantage of such control device is the fact that the momentum of the primary flow stream is preserved, and any pressure drop across the device is quite small. In addition, such devices may be made to be bi-stable, that is, once the primary stream is deflected to flow through a branch stream, the boundary layer effect between the stream and the flow passage walls tends to lock the primary stream to flow in this direction. When pressure from one of the control ports is applied, the action of the main stream is switching from one outlet to the other is virtually instantaneous. The amplifier may be designed so that it is only after a predetermined pressure flow is achieved at the control port that the main flow will switch from one outlet branch to the other.

Referring once again to FIGURE 2, the tubular extension 24, as discussed above, communicates with opening 33 of inlet fitting 27. When motor 8 starts to rotate, the action of the cam plate 15 and piston spring 19 on the piston will cause the piston to reciprocate within housing 17. As described above, air will be compressed within chamber 17A until a predetermined pressure has been achieved, at which time ball valve 25 will depress and permit a stream of air under pressure to flow through tubular extension 24 into inlet fitting 27 and passage 32 under substantial pressure and mass flow. The air then flows from passage 32 into passage 34 and the inlet chamber 46 of the control plate.

A main stream of air egresses from chamber 46 through the passage 51 and into a second chamber 52. From chamber 52, the air may exit through passageway 53 and then out through the first outlet 47, or it may exit through passageway 54 and then out through the second outlet 48. As is well known in the fluid amplifier art, control ports 49 and 50 communicate with chamber 52 by means of passageways 55 and 56 respectively. A jet of control fluid may be applied to chamber 52 by either of passageways 55 or 56. In the most common arrangement, when a control jet enters chamber 52 from passageway 55 simultaneously with the main fluid stream from passageway 51, the resulting mixture exits from chamber 52 through passageway 54. Chamber 52 and its adjoining passageways may be designed so that under the foregoing conditions, virtually no air will exit through the passageway 53. Conversely, if a control jet is introduced into chamber 52 from passageway 56 and, if chamber 52 and the adjoining passageways have been so designed, no fluid will exit through passageway 54.

The fluid amplifier may be designed so that, instead of applying a positive control jet by means of either of passageways 55 or 56, it is possible to control the flow of fluid by letting the main flow of fluid entering chamber 52 through passageway 51 aspirate the control fluid through either passageway 55 or 56. With this arrangement, if control port 49 is closed and control port 50 opened, fluid entering through inlet chamber 46 and passing through passageway 51 into chamber 52, will aspirate ambient air through passageway 56 and the resulting mixture will exit from chamber 52 through passageway 53. Similarly, if control inlet 50 is closed and the control inlet 49 is opened, the resulting mixture will exit from chamber 52 through passageway 54. The time elapsed for switching from one outlet branch to the other, for gaseous fluids such as air, is as short as ½ to one millisecond. The operational details of the fluid amplifier in conjunction with the fluid compression means will be further explained following a brief description of the motor circuit.

Referring now to FIGURE 5, the energizing circuit for motor 8 is provided through a pair of leads L-1 and L-2 which are intended to be connected across a suitable source of power (not shown), which will generally be the conventional 110 volt single phase source provided for domestic use. The circuit for the start winding S commences with lead L-2 and extends through conductors 57 and 58 to the terminal 40 disposed within fluid amplifier 28. A conductor 59 connects terminal 41 with the start winding S of the motor. Normally, the contact plate 42 is biased by spring 43 into bridging contact relationship with terminals 40 and 41, to provide a continuous circuit for the start winding. The opposite end of the start winding is connected to conductor 60. The circuit for the run winding R includes a branch conductor 61 that extends from conductor 57 to one end of the run winding R. The opposite end of the run winding is connected to conductor 60, along with the start winding S. Disposed in conductor 60 is a conventional overload device 62. A switch 63 is provided along conductor 60 to complete the circuitry between the windings S and the power source L-1. Where the motor is used to drive a food waste disposer, as illustrated herein, the switch 63 may either be a conventional wall switch, or may be connected through proper circuitry to a contact switch positioned within the inlet fitting of the disposer, where it is adapted to be closed by the disposer opening guard.

The operation of the fluid responsive structure in conjunction with the energization circuit of the motor is as follows. When switch 63 is closed and draws power from lead L-1, the completed circuit includes lead L-1, switch 63, conductor 60, run winding R, return conductor 61, conductor 57, and lead L-2. Also energized at this time is the start winding S, conductor 59, the completed circuit through the fluid amplifier by way of terminal 41, contact plate 42, terminal 40, conductor 58, conductor 57 and lead L-2.

As soon as the motor is started, and sufficient pressure is built up within compression chamber 17A, air under pressure will depress ball valve 25 and pass through the tubular extension 24 of housing 16 and into the inlet fitting 27 of the amplifier. This air will then pass through passages 32 and 34, where it eventually enters the inlet or power chamber 46 of the amplifier.

When the motor is started, opening 35 to chamber 36 is in its normally closed condition because of the action of spring 38 on the second ball valve 37. This prevents the flow of air into passage 39 and control port 49. Since control port 50 is open to atmosphere, and control port 49 is effectively closed, the pressure differential between the two control ports is such that atmospheric air flows into control port 50 and through passageway 56 towards chamber 52. As the power or main stream of air flows from the inlet chamber 46 through passageway 51 and into chamber 52, the control pressure from passageway 56 deflects the main flow to the right as illustrated in FIGURE 5, and out branch passageway 53 where it exists from the amplifier by way of outlet port 47. As the motor approaches operational speed, and the piston 16 reciprocates at a greater speed, air exiting from the compression chamber 17A increases proportionally in pressure.

The second ball valve 37 and compression spring 38 are designed so that at a suitable speed below the maximum speed, the pressure applied against ball valve 37 is sufficient to move it downwardly, with the result that air under pressure will also flow through chamber 36, passage 39, and then into the control port 49 of the amplifier.

At this time, the pressure differential between passages 55 and 56 is reversed, i.e. the pressure from passageway 55 is greater than that from passageway 56. Accordingly, the main stream of air passing through chamber 52 will be deflected toward the second branch passageway 54. While the time required to build up sufficient pressure to displace the second ball valve 37 is on the order of one to three seconds, depending on the load, the time elapsed in switching from one outlet branch to the other is about one millisecond. The main stream of air will leave passageway 54 by way of outlet port 48, which directs the flow of air against contact plate 42. The air flow pressure through outlet port 48 is sufficent to overcome the force of the biasing spring 43 that holds plate 42 in contact relationship with terminals 40 and 41. Accordingly, as soon as air is directed into outlet passageway 54, contact plate 42 is immediately raised from its bridging position and thereby de-energizes the start winding. The completed circuit will then include the power lead L–1, switch 63, conductor 60, run winding R, conductor 61, and return conductor 57 which joins the second lead L–2.

If the speed of the motor drops below the desired operational speed, the pressure applied against ball valve 37 will decrease, and the force of compression spring 38 will force the ball valve into its closed position. At this time, the conditions described above with reference to the initial starting procedure of the motor prevail. The ambient pressure from control port 50 will again be greater than that from control port 49, thus causing the main stream of fluid to instantaneously deflect from branch passageway 54 to branch passageway 53. As soon as the pressure is removed from the bottom of contact plate 42 spring 43 will force contact plate 42 into bridging contact with terminals 40 and 41 to thereby complete the circuit for the start winding. The start winding will remain energized until the motor reaches the specific rotational speed at which air flow from the compression chamber causes the ball valve 37 to deflect downwardly, with the result that the air flow through the amplifier will change in the manner heretofore described.

Figure 3:
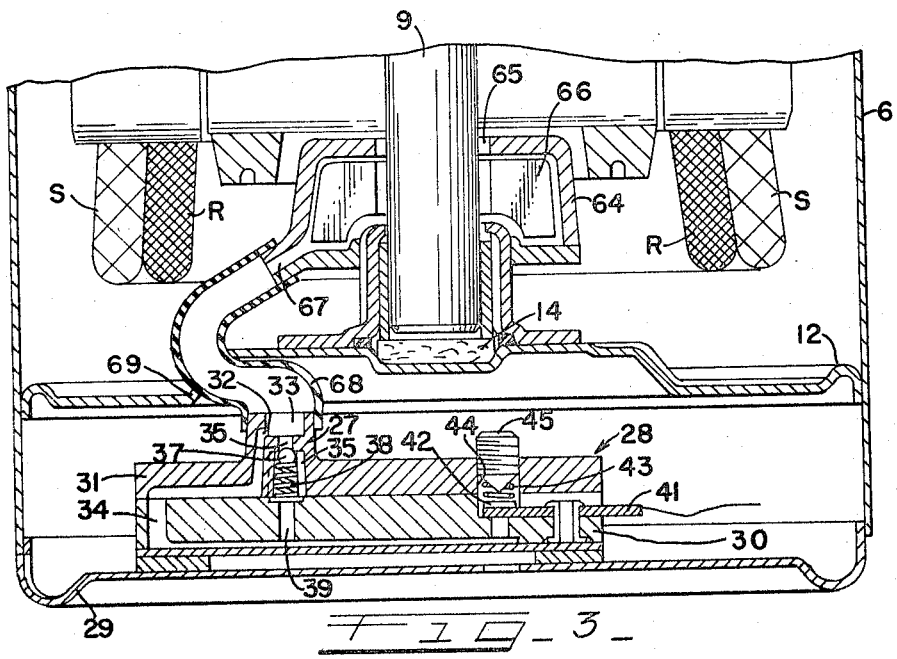
FIGURE 3 is an enlarged side elevational view in partial cross section of a second embodiment of my invention.

In the embodiment of FIGURE 3, the fluid amplifier structure 28, as mentioned above, is identical to that described in FIGURE 2. The major difference between the two embodiments is in the fluid compression means for providing the flow of fluid to the inlet fitting 27 of the fluid amplifier. In the embodiment heretofore described, the compression of air was accomplished by means of the cam lobes and piston follower arrangement that compressed air within a first compression chamber 17A and then forced it through a tubular passage. In the second embodiment, the fan or compression chamber 64 is rigidly secured about the upper portion of the bearing cup 13, and surrounds shaft 9. An annular passage 65 at the top of the chamber permits air to flow into the chamber. A plurality of fan or pump blades 66 are rigidly secured to shaft 9 within the area defined by the compression casing 64. The blades 66 rotate within the compression chamber 64 as the shaft rotates during operation of the motor. The blades effect an increased compression of air within the casing that is directly proportional to the operational speed of the motor.

One side of the compression casing 64 is formed to provide a suitable discharge outlet 67 through which a stream of air may exit from the chamber. Extending from discharge outlet 67 is a flexible conduit 68 which passes through an opening 69 in bearing plate 12. Conduit 68 is rigidly secured at its opposite end to the inlet fitting 27 that forms part of the fluid amplifier, as heretofore described. In this embodiment, when motor 8 starts to rotate, the fan blades 66 disposed within compressor casing 64 will channel air through the discharge outlet 67. The air stream then will flow through conduit 68, inlet fitting 27, and passages 32 and 34 of the fluid amplifier under substantial pressure and mass flow. At this time, the operation of ball valve 37 and compression spring 38 in passage 35 are identical to that described hereabove with reference to the embodiment illustrated in FIGURES 1 and 2.

It will be seen from the foregoing that my invention provides two novel physical structures used in conjunction with a fluid responsive device for controlling the energization of the start winding in a single phase induction motor. The operation of my motor control means is such that the start winding of the motor is brought into or out of a circuit automatically in response to a precise rotational speed of the motor. I have illustrated two different embodiments that are both compact, yet provide a source of air under pressure that is proportional to the operational speed of the motor. In conjunction with my novel construction for providing a stream of air under pressure, there is provided a fluid responsive control in which it is only upon reaching a predetermined speed that the full air flow is directed against the start winding contacts to effect de-energization of the start winding circuit.

While in accordance with the patent statutes I have described what is at present thought to be the preferred embodiment of my invention, it will be obvious to those skilled in the art that various changes and modifications may be made therein, and it is intended to cover in the appended claims all such modifications as fall within the true spirit and scope of my invention.

I claim:

1. For use with a single phase induction motor having a main winding, a start winding, and a motor shaft, improved control means comprising:
   (a) pressure actueated contact mean actuable at a preselected pressure to de-energize the start winding;
   (b) a compression chamber adapted to be disposed adjacent the motor shaft, said compression chamber having a fluid inlet opening thereto and a fluid discharge outlet therefrom;
   (c) fluid compression means disposed within said compression chamber and adapted to be operatively associated with the motor shaft to provide a stream of fluid through said fluid discharge outlet at pressures proportional to the speed of the motor;
   (d) a fluid amplifier having an inlet opening, a power chamber, first and second control ports and first and second outlet passages;
      (i) said first outlet passage being adapted to exhaust said fluid stream to atmosphere;
      (ii) said second outlet passage communicating with said pressure actuated contact means and adapted to direct said fluid stream against said pressure actuated contact means;
      (iii) said second control port communicating with atmosphere and adapted to admit air at ambient pressure to said fluid amplifier;
   (e) first fluid connecting means interconnecting said fluid discharge outlet of said compression chamber to said inlet opening of said fluid amplifier;
   (f) a first fluid conducting passage interconnecting said inlet opening to said power chamber;
   (g) a second fluid conducting passage interconnecting said first fluid conducting passage with said first control port;
   (h) pressure actuated valve means disposed in said second fluid conducting passage to normally prevent fluid flow therethrough, said pressure actuated valve means being responsive to a predetermined pressure of said fluid stream at least as great as said preselected pressure flowing through said first fluid conducting passage to admit a portion of said fluid stream into said second fluid conducting passage and thereby pass fluid under pressure through said first control port;

(i) said power chamber, said first and second control ports, said first outlet passage and said second outlet passage being arranged so that said fluid stream entering said power chamber will exit substantially exclusively through said first outlet passage so long as air under ambient pressure enters through said second control port and said pressure actuated valve prevents the flow of fluid through said first control port; and (j) said power chamber, said first and second control ports, said first outlet passage and said second outlet passage being further arranged so that, when said pressure actuated valve means admits fluid through said first control port, the flow of said fluid stream will be essentially instantaneously deflected into said second outlet passage and actuate said pressure actuated contact means to de-energize the start winding when the motor exceeds a predetermined operational speed.

2. The invention of claim 1, wherein said fluid compression chamber comprises an annular housing adapted to suround a segment of the shaft, and said fluid compression means comprise fan blades adapted to be secured to the shaft and disposed within said housing, such that, upon rotation of the shaft, said fan blades effect a compression of fluid within said housing at pressures proportional to the speed of the motor.

3. The invention of claim 1, wherein said compression chamber comprises a housing adapted to be disposed adjacent the shaft, said housing having a fluid inlet opening thereto and a fluid discharge outlet therefrom, and said fluid compression means includes cam means adapted to be secured to the shaft for rotation therewith and a piston disposed within said housing and adapted to be operatively associated with said cam means, such that, upon rotation of the shaft, said piston effects a compression of fluid in said housing at pressures proportional to the speed of the motor.

4. The invention of claim 1, wherein said compression chamber comprises a housing adapted to be disposed adjacent the shaft, said housing having a fluid inlet opening thereto and a fluid discharge outlet therefrom, and said fluid compression means includes:

(a) cam means adapted to be secured to the shaft for rotation therewith;

(b) a piston disposed within said housing, with one end of said piston adapted to contact said cam means;

(c) a piston spring interposed between the opposite end of said piston and said housing, whereby said cam means and said piston spring can effect reciprocation of said piston within said housing upon rotation of the shaft;

(d) said piston having a body portion thereon in peripheral contact with said housing so as to divide said housing into first and second chambers, said fluid inlet opening being disposed in said first chamber, and said fluid discharge outlet being disposed in said second chamber;

(e) passage means extending through said body portion of said piston, whereby fluid may flow from said first chamber to said second chamber;

(f) diaphragm means secured to said piston over said passage means, said diaphragm means being adapted to allow fluid to pass to said second chamber from said first chamber upon movement of said piston in a first direction, said diaphragm preventing the return flow of fluid through said passage upon movement of said piston in the opposite direction, whereby fluid present in said second chamber is compressed;

(g) said fluid conducting means interconnecting said discharge outlet of said compression chamber to said inlet opening of said fluid amplifier comprises a tubular duct extending from said housing; and (h) a second pressure responsive valve means disposed in said tubular duct and adapted to close said fluid discharge outlet until a predetermined pressure is achieved in said second chamber, whereupon said pressure responsive valve is adapted to admit fluid under pressure through said tubular duct to said inlet opening of said fluid amplifier.

References Cited
UNITED STATES PATENTS

| | | | |
|---|---|---|---|
| 1,834,217 | 12/1931 | Lipman | 318—221 |
| 1,946,165 | 2/1934 | Irwin | 318—221 |

ORIS L. RADER, *Primary Examiner.*

GENE RUBINSON, *Assistant Examiner.*

U.S. Cl. X.R.

137—82